(12) United States Patent
Takagi et al.

(10) Patent No.: US 7,457,632 B2
(45) Date of Patent: Nov. 25, 2008

(54) RADIO BASE STATION APPARATUS AND TRANSMISSION POWER CONTROL METHOD

(75) Inventors: Kenki Takagi, Tokyo (JP); Kenichi Ito, Tokyo (JP); Takahiro Yasaki, Tokyo (JP); Takanori Mikoshiba, Tokyo (JP)

(73) Assignee: NEC Corporation (JP)

( * ) Notice: Subject to any disclaimer, the term of this patent is extended or adjusted under 35 U.S.C. 154(b) by 91 days.

(21) Appl. No.: 10/591,503

(22) PCT Filed: Mar. 1, 2005

(86) PCT No.: PCT/JP2005/003353

§ 371 (c)(1), (2), (4) Date: Sep. 1, 2006

(87) PCT Pub. No.: WO2005/083909

PCT Pub. Date: Sep. 9, 2005

(65) Prior Publication Data

US 2007/0184863 A1 Aug. 9, 2007

(30) Foreign Application Priority Data

Mar. 1, 2004 (JP) .............................. 2004-056327

(51) Int. Cl.
*H04Q 7/20* (2006.01)
(52) U.S. Cl. .................. 455/507; 455/403; 455/561
(58) Field of Classification Search .................. 455/507
See application file for complete search history.

(56) References Cited

U.S. PATENT DOCUMENTS

| | | | | |
|---|---|---|---|---|
| 5,530,917 A | * | 6/1996 | Andersson et al. | 455/436 |
| 6,104,933 A | * | 8/2000 | Frodigh et al. | 455/522 |
| 6,118,983 A | * | 9/2000 | Egusa et al. | 455/69 |
| 6,147,981 A | * | 11/2000 | Prescott | 370/318 |
| 6,160,999 A | * | 12/2000 | Chheda et al. | 455/69 |
| 6,185,431 B1 | * | 2/2001 | Li et al. | 455/522 |
| 6,501,959 B1 | * | 12/2002 | Seon | 455/522 |

(Continued)

FOREIGN PATENT DOCUMENTS

| | | |
|---|---|---|
| EP | 1 233 546 A1 | 8/2002 |
| JP | 11-234203 | 8/1999 |
| JP | 2000-349689 | 12/2000 |
| JP | 2001-036463 | 2/2001 |

(Continued)

OTHER PUBLICATIONS

English translation of Notification of Transmittal of Preliminary Report on Patentability dated Nov. 29, 2006 for PCT/JP2005/003353.

*Primary Examiner*—Matthew Anderson
*Assistant Examiner*—Hai V Nguyen
(74) *Attorney, Agent, or Firm*—Ostrolenk, Faber, Gerb & Soffen, LLP

(57) ABSTRACT

A wireless base station unit (100) monitors total transmission power, which is a sum of transmission power to all of mobile station terminals (200-203) connected for communication. When the total transmission power exceeds a first threshold value, which is a criterion for judging whether to reduce the transmission power or not, an upper limit value of the transmission power to the mobile station terminal at the lowest priority level is reduced by a prescribed quantity. When the total transmission power exceeds a second threshold value, which is larger than the first threshold value, communication connection with the mobile station terminal at the lowest priority level is cut.

18 Claims, 10 Drawing Sheets

U.S. PATENT DOCUMENTS

| | | | | |
|---|---|---|---|---|
| 6,643,272 B1* | 11/2003 | Moon et al. | ............ | 370/311 |
| 6,738,605 B1* | 5/2004 | Gilberton et al. | ............ | 455/127.1 |
| 6,788,943 B1* | 9/2004 | Hamalainen et al. | ............ | 455/450 |
| 6,813,479 B2* | 11/2004 | Voyer | ............ | 455/69 |
| 6,909,704 B2* | 6/2005 | Sakoda | ............ | 370/335 |
| 6,917,599 B2* | 7/2005 | Kono | ............ | 370/320 |
| 6,931,257 B2* | 8/2005 | Shahidi et al. | ............ | 455/522 |
| 7,024,203 B1* | 4/2006 | Naghian | ............ | 455/453 |
| 7,027,829 B1* | 4/2006 | Laakso et al. | ............ | 455/522 |
| 7,167,718 B2* | 1/2007 | Hayashi et al. | ............ | 455/522 |
| 7,190,964 B2* | 3/2007 | Damnjanovic et al. | ............ | 455/522 |
| 7,193,978 B2* | 3/2007 | Ishikawa et al. | ............ | 370/320 |
| 7,260,404 B2* | 8/2007 | Utakouji | ............ | 455/452.1 |
| 7,277,721 B2* | 10/2007 | Okumura et al. | ............ | 455/522 |
| 2001/0019943 A1* | 9/2001 | Bender et al. | ............ | 455/13.4 |
| 2002/0094835 A1* | 7/2002 | Hayashi et al. | ............ | 455/522 |
| 2002/0173309 A1* | 11/2002 | Shahidi et al. | ............ | 455/442 |
| 2003/0189907 A1* | 10/2003 | Miyamoto et al. | ............ | 370/320 |
| 2003/0210660 A1* | 11/2003 | Wiberg et al. | ............ | 370/320 |
| 2004/0005898 A1* | 1/2004 | Kato et al. | ............ | 455/450 |
| 2004/0106407 A1* | 6/2004 | Kikuma et al. | ............ | 455/436 |
| 2005/0135320 A1* | 6/2005 | Tiedemann et al. | ............ | 370/338 |
| 2006/0034438 A1* | 2/2006 | O'Neill | ............ | 379/114.07 |
| 2006/0166665 A1* | 7/2006 | Shinoi | ............ | 455/426.1 |
| 2006/0211440 A1* | 9/2006 | Nomiya et al. | ............ | 455/522 |
| 2007/0129096 A1* | 6/2007 | Okumura et al. | ............ | 455/522 |

FOREIGN PATENT DOCUMENTS

| | | |
|---|---|---|
| JP | 2002-118515 | 4/2002 |
| JP | 2002-217829 | 8/2002 |

* cited by examiner

US 7,457,632 B2

RADIO BASE STATION APPARATUS AND TRANSMISSION POWER CONTROL METHOD

The present application is a 35 U.S.C. § 371 national phase conversion of PCT/JP2005/003353 filed Mar. 1, 2005, which is hereby incorporated by reference. The PCT International application was published in the Japanese language.

TECHNICAL FIELD

The present invention relates to a radio base station apparatus which enables radio communications with mobile station terminals such as portable telephones, and a transmission power control method therefor.

BACKGROUND ART

Conventionally, in a communications system which employs mobile station terminals such as portable telephones, radio base station apparatuses (hereinafter called the "base station") are provided for transmitting/receiving signals to/from mobile station terminals in order to enable communications with the mobile station terminals over the air within a coverage area which is an area in which communication services are provided. One base station is installed in every predetermined area such that a plurality of base stations cover the entire coverage area. An area covered by one base station is called a "cell." A plurality of base stations are connected to a radio network controller which controls the base stations, and are connected to a communications network, which serves as a telephone network, through the radio network controller.

As a user manipulates a mobile station terminal within a coverage area, the mobile station terminal generally transmits/receives signals to/from the base station closest thereto, and is connected to a destination terminal through a communications network in a communicable manner. A signal transmitted by a base station to a mobile station terminal includes a common channel which has contents common to all mobile station terminals within a cell, and includes a dedicated channel whose contents differ from one mobile station terminal to another. The base station can adjust transmission power on a channel-by-channel basis.

The common channel includes information for operating a communications system such as cell information, and information required for a terminal to communicate with a base station. The cell information includes information required for a mobile station terminal to establish synchronization with a base station, information on neighboring cells, information on an interference level, a cell regulation state, and the like.

The dedicated channel is a channel for carrying user data which is data specific to an individual mobile station terminal, and for carrying data at high communication rates such as voice data, voice and image data for a videophone, packets and the like.

When multiple users attempt to manipulate their mobile station terminals for placing a call within a cell, communications of the multiple mobile station terminals concentrate on a single base station which covers the cell. Then, since the base station must transmit a signal of a different dedicated channel to each of the mobile station terminals which are in communication, the total transmission power of the base station is larger because the number of mobile station terminals that are used has increased. Also, even when there are not so many mobile station terminals, the total transmission power from the base station can increase if a poor radio propagation environment is present between the mobile station terminals and base station. To protect the base station apparatus from the total transmission power which increases in this manner, a limit value is set to a value which is lower than maximum transmission power which can be actually provided by the base station. In the following, the total transmission power reaching the limit value is assumed to be "100% of the total transmission power."

The base station conducts a control of limit for adjusting the total transmission power to be equal to or lower than 100% in order to protect the apparatus, when the total transmission power exceeds 100%, by uniformly reducing the transmission power irrespective of the dedicated channel or common channel. An example of this control of limit is disclosed in JP-A-11-234203. The control of limit for the total transmission power in the base station will be described with reference to drawings.

FIGS. 1A and 1B are diagrams for describing the control of limit.

As shown in FIG. 1A, the total transmission power of the base station can exceed 100% due to an increase in the number of mobile station terminals connected to the base station for communication, or due to an exacerbated radio propagation environment between the base station and mobile station terminals. In this event, the apparatus itself will fail if the base station continues to provide the transmission power which exceeds the limit value.

FIG. 1B shows a manner in which the base station conducts the control of limit when the total transmission power of the base station exceeds 100%. When the control of limit is conducted, the base station reduces the transmission power of all channels by a fixed amount irrespective of the dedicated channel or common channel. Reference numeral 500 indicates the amount of attenuation.

A company which operates the communications system described above (hereinafter called the "system operation company") may wish to give priority levels to certain calls which mean communication connection of the base station with mobile station terminals. For example, the system operation company may wish to give a higher priority level to urgent calls from mobile station terminals to the police or fire station in urgent cases.

Even if it is desired to give priority levels to calls in this way, the conventional limiter control reduces the transmission power for all mobile station terminals by a fixed amount without considering call priority levels, so that the reduction is also applied to the transmission power value for a mobile station terminal which places a highly prioritized call. For this reason, a highly prioritized call can be disconnected. A call is disconnected due to a reduction in the transmission power from the base station, which results in a failure to ensure a signal quality required for signals received by a mobile station terminal from the base station.

Also, since the transmission power of the common channel uniformly attenuates as well, the area covered by the base station is reduced. This can give rise to a failure in hand-over between base stations by a mobile station terminal, or the inability of a mobile station terminal to originate or receive signals even within a cell which can be essentially covered by the base station. In such a circumstance, services are not sufficiently provided to users of mobile terminals which place highly prioritized calls.

DISCLOSURE OF THE INVENTION

It is an object of the present invention to provide a radio base station apparatus and a transmission power control method which restrain an increase in total transmission power and which supply transmission power which ensures ideal reception quality for mobile station terminals of users associated with highly prioritized communication connections, even if the number of used mobile station terminals is increased.

A radio base station apparatus of the present invention for achieving the above-mentioned object is a radio base station apparatus for communicating with a plurality of mobile station terminals over the air, and comprises a storage unit which has previously stored therein upper limit values of transmission power for the mobile station terminals, a first threshold referenced to determine whether or not the transmission power is reduced, a second threshold larger than the first threshold, and priority levels of the mobile station terminals, and a control unit for monitoring total transmission power which is the sum of the transmission power for all the mobile station terminals connected for mutual communication, by a predetermined value, reducing the upper limit value of the transmission power for the mobile station terminal which is assigned the lowest priority level when the total transmission power exceeds the first threshold, and terminating communication with the mobile station terminal which is assigned the lowest priority level when the total transmission power exceeds the second threshold.

Also, a transmission power control method of the present invention for achieving the above-mentioned object is a transmission power control method by a radio base station apparatus having a control unit and a storage unit for communicating with a plurality of mobile station terminals over the air. The method has the steps of storing upper limit values of transmission power for the mobile station terminals, a first threshold referenced to determine whether or not the transmission power is reduced, a second threshold larger than the first threshold, and priority levels of the mobile station terminals in the storage unit, monitoring total transmission power which is the sum of the transmission power for all the mobile station terminals connected for mutual communication, and by a predetermined value, reducing the upper limit value of the transmission power for the mobile station terminal which is assigned the lowest priority level when the total transmission power exceeds the first threshold, and terminating communication with the mobile station terminal which is assigned the lowest priority level when the total transmission power exceeds the second threshold.

In the present invention, when the total transmission power exceeds the first threshold, the upper limit of the transmission power is reduced for a low prioritized mobile station terminal, so that even if the transmission power for this mobile station terminal increases to the upper limit value, the total transmission power can be prevented from increasing beyond the conventional case. Also, when the total transmission power exceeds the second threshold, a communication connection with low prioritized mobile station terminal is shut off, so that the value of the total transmission power is reduced more than the reduction of the upper limit value of the transmission power for the mobile station terminal. Further, by assigning higher priority levels to a mobile station terminal which is making an important communication, and a mobile station terminal of a preferentially treated user, a highly prioritized mobile station terminal will not suffer from a reduction in the upper limit value of the transmission power therefor, or disconnection of its communication connection.

Also, in the radio base station apparatus of the present invention described above, the larger a communication capacity that is required by the mobile station terminal, the higher may be the priority level assigned to the mobile station terminal. In the present invention, a higher priority level is assigned to a mobile station terminal which requires a larger communication capacity in order to prevent a reduction in the transmission power for a communication which requires a large capacity, so that the communication can be stably made even when a large amount of information is sent.

Also, in the radio base station apparatus and transmission power control method of the present invention described above, when the radio base station apparatus is connected with the mobile station terminals through communications using a spread spectrum technology, the smaller a spreading factor that is used in the communication, the lower may be the priority level assigned by the control unit. The smaller the spreading factor is, the larger the transmission power is in the spread spectrum technology. In the present invention, the lower is the priority level assigned to a mobile station terminal which presents a smaller spreading factor, thus making it possible to increase the probability that larger transmission power will be controlled.

Also, in the radio base station apparatus and transmission power control method of the present invention described above, the smaller the spreading factor, the larger may be the predetermined value assigned by said control unit. The smaller the spreading factor is, the larger the transmission power is. In the present invention, the smaller the spreading factor, the lager is the amount which is reduced to the upper limit value, so that the amount which is reduced to the upper limit of the total transmission power increases.

Also, in the radio base station apparatus and transmission power control method of the present invention described above, the larger the communication capacity that is required by the mobile station terminal, the smaller may be the predetermined value assigned by said control unit. In the present invention, the larger the communication capacity, the smaller is the amount which is reduced to the upper limit value, thus preventing a large reduction in the upper limit value of the transmission power for a communication which requires a large capacity and accomplishing stable communications even when a large amount of information is sent.

Also, in the radio base station apparatus and transmission power control method of the present invention described above, the control unit may calculate the difference between the upper limit value stored in the storage unit and the current transmission power for the mobile station terminal, and may set the difference in values to the predetermined value. In the present invention, since the current transmission power is ensured even for a low prioritized mobile station terminal, a sudden shut-off of a communication connection with the mobile station terminal can be prevented.

Further, in the radio base station apparatus and transmission power control method of the present invention described above, the control unit may reduce by the predetermined value in stages. In the present invention, since the transmission power is reduced in stages for a low prioritized mobile station terminal, the user can be notified that the reception condition is becoming worse little by little, thus preventing a sudden shut-off of a communication connection of the mobile station terminal.

Accordingly, in the present invention, the radio base station apparatus monitors the total transmission power value, and conducts control to restrain the upper limit value of the transmission power for a low priority user or to request release of a call from/to a low priority user when the total transmission power value exceeds the certain threshold. It is therefore possible not to exceed the upper limit value of radio capacity for protection of the radio base station apparatus, and it is possible to reduce the probability of disconnection of a call from/to a mobile station terminal of a highly prioritized user.

Also, when the total transmission power of the radio base station apparatus reaches 100%, the transmission power will not be uniformly reduced for all mobile station terminals, thus making it possible to reduce the probability that a plurality of users will suffer from disconnected calls.

BEST MODE FOR CARRYING OUT THE INVENTION

A radio base station apparatus of the present invention previously sets thresholds for total transmission power, and searches for a user who is assigned a low priority level when the total transmission power exceeds the threshold, and conducts control for restraining the transmission power from the base station to the mobile station terminal of the user.

Embodiment 1

A description will be given of the configuration of this embodiment.

Figure 1A:
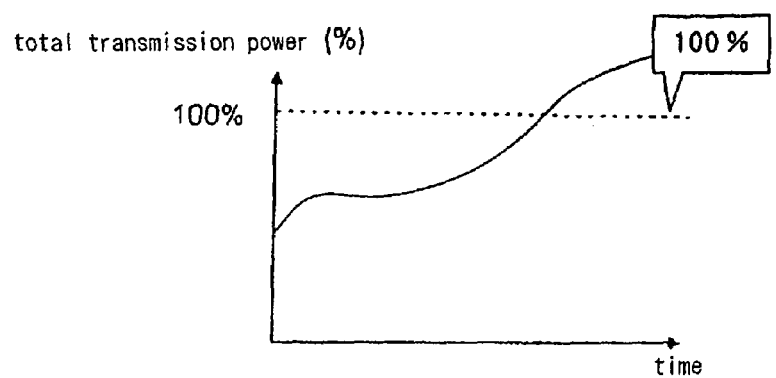
FIG. 1A is a diagram for describing a method for controlling total transmission power by a conventional radio base station apparatus.
Figure 1B:
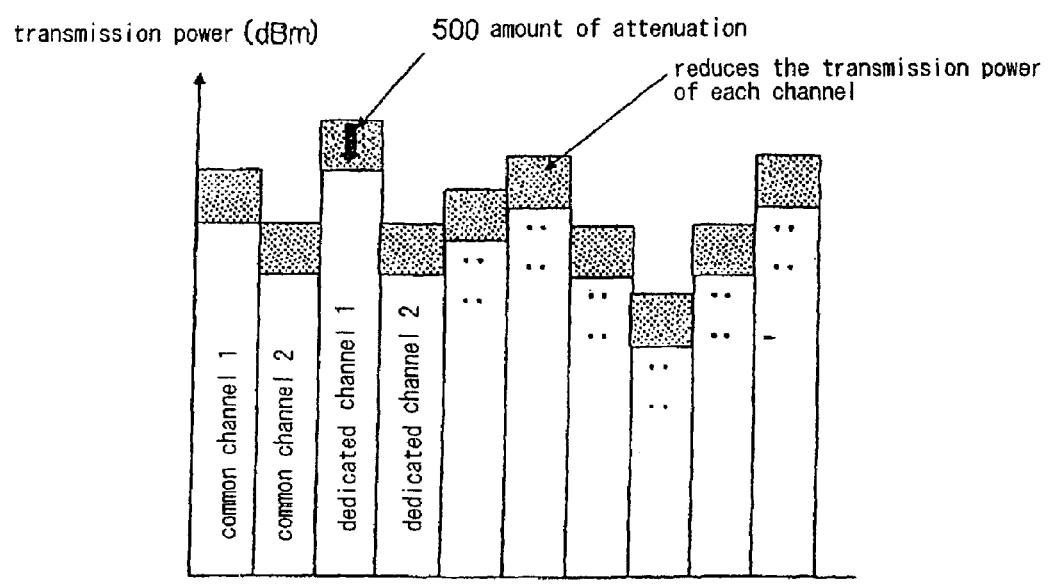
FIG. 1B is a diagram for describing the method for controlling total transmission power by the conventional radio base station apparatus.
Figure 2:
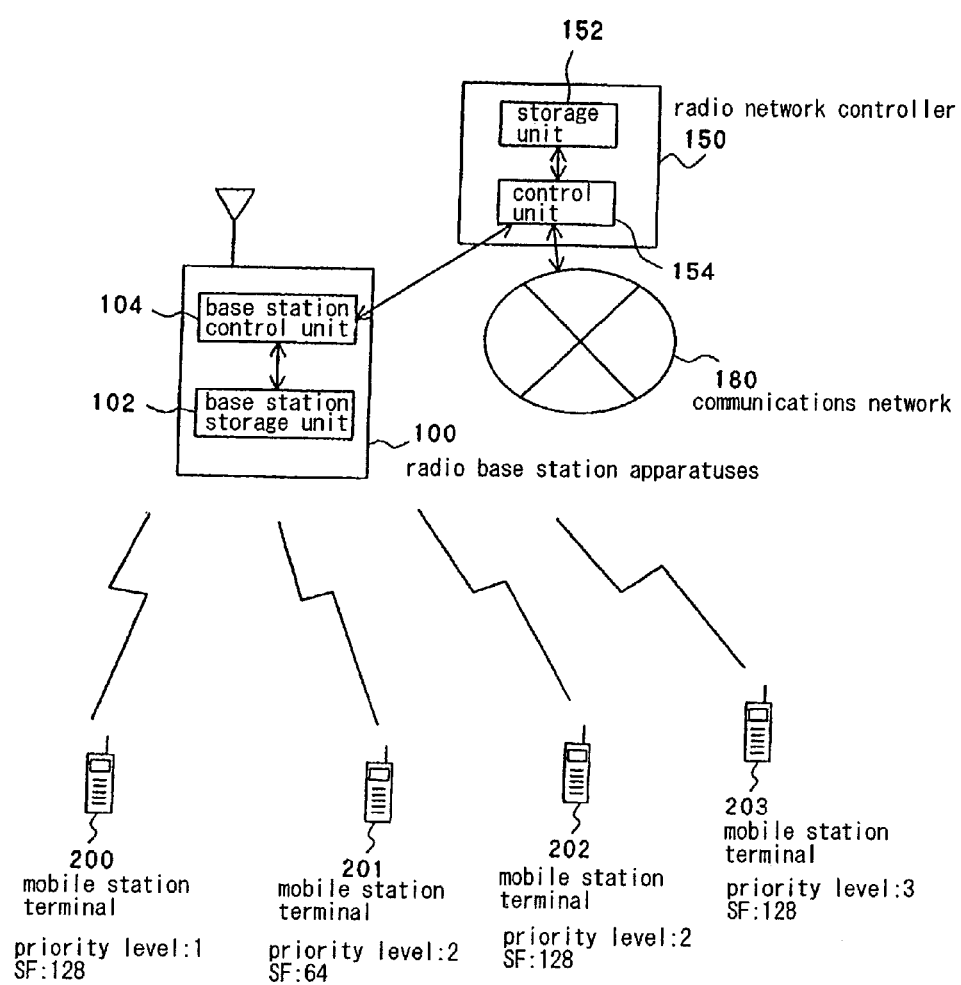
FIG. 2 is a block diagram illustrating an exemplary configuration of a communications system according to an embodiment.

FIG. 2 is a block diagram illustrating an exemplary configuration of a communications system of this embodiment. Assume in this embodiment that the communications system employs a normal spread spectrum technology (CDMA: Code Division Multiple Access).

As illustrated in FIG. 2, the communications system comprises base station 100, and radio network controller 150 for controlling base station 100. Radio network controller 150 is connected to communications network 180 which serves as a telephone network. Base station 100 is connected to mobile station terminals 200-203 by radio communications. Base station 100 is installed every several tens of kilometers, and a cell is assigned to each base station 100.

It should be noted that while a plurality of base stations may be connected to radio network controller 150, there is one base station 100 in this embodiment in order to simplify the description. Also, this embodiment shows a scenario in which there are four mobile station terminals. Since mobile station terminals 200-203 are similar in configuration to general portable telephones, a detailed description thereof is omitted. Also, for a description of the configuration and operation of the mobile station terminals, mobile station terminal 200 will be described as representative of mobile station terminals 200-203.

Further, the following description will be given of the configuration and operation associated with the control of the transmission power, which is a feature of the present invention, and detailed descriptions will be omitted for the configuration and operation associated with general functions of base station 100 including radio modulation/demodulation processing, as well as general functions of radio network controller 150 including line connection control, hand-over control and the like.

As a user manipulates mobile station terminal 200 to enter a telephone number of a destination for placing a call, mobile station terminal 200 transmits a call signal, which is a signal including information on the entered telephone number of the destination and its own telephone number for requesting a communication connection, to radio network controller 150 through base station 100.

Radio network controller 150 comprises storage unit 152 for previously storing user setting information which differs from one user to another, control unit 154 for sending information on user priority level to base station 100, and a manipulation unit (not shown) for an operator to enter instructions. Control unit 154 comprises a CPU (Central Processing Unit) for executing predetermined processing in accordance with a program, and a memory for storing programs. The user setting information has a user identifier for identifying the user, and a priority level indicative of the priority of a communication connection for the mobile station terminal of the user. Assume in the following that the user identifier is the telephone number of the mobile station terminal.

The priority level is determined on the basis of the type of service provided by a system operation company. The type of service is determined in the following manner from communication setting information which includes three items.

The three items are communication contents, communication method, and communication capacity, each of which is classified into divisions that are ranked according to user priority levels. For example, the communication contents may be a voice only, or a voice and a moving image for videophone. In this event, the videophone is ranked higher because the videophone involves a larger amount of information and a higher fee charged to the user than the voice-only case. The communication method is classified according to whether a modem is used, whether communications are made through packets, and the like. The communication capacity refers to the amount of information which can be communicated per unit time, and the information amount is classified into a plurality of divisions. In this event, a division with a larger amount of information is ranked higher because a higher fee is charged to the user. The type and priority level are determined for a service by totalizing the ranks of the three items, and the priority level is stored in the user setting information in storage unit 152.

By previously storing in storage unit 152 a communication setting table which describes information on the rank for each item of the communication setting information, as the operator of the system operation company manipulates radio network controller 150 to enter the three items of the communication setting information for each user, control unit 154 totalizes the ranks for the three items for each user in order to determine the priority level, and stores the determined priority level and communication setting information in the user setting information in storage unit 152.

The communication setting table also comprises a table in which an upper limit value is found for the transmission power of a dedicated channel from base station 100 to the mobile station terminal once the three items have been respectively determined. Control unit 154 references the communication setting table to retrieve an upper limit value corresponding to communication setting information read from the user setting information, and stores the upper limit value in the user setting information.

Upon receipt of a call signal from mobile station terminal 200 through base station 100, control unit 154 checks whether or not a telephone number of a destination included in the call signal is that of the police or fire station for an urgent communication. Then, when the destination is not associated with an urgent communication, control unit 154 searches storage unit 152 for user setting information which includes a telephone number that matches the telephone number of the originator included in the call signal. Upon finding the user setting information including the telephone number which matches that of the originator through the search, control unit 154 reads user priority level information including information on the telephone number, priority level, and upper limit value from the user setting information for transmission to base station 100.

On the other hand, when the destination is associated with an urgent communication, control unit 154 changes the priority level included in the user priority level information to the highest priority level, and transmits the changed user priority level information to base station 100.

Upon receipt of a call signal from mobile station terminal 200 through base station 100, control unit 154 also determines an optimal spreading factor (SF) from the transfer rate of communication. Then, control unit 154 stores the SF in storage unit 152, as included in the user setting information, and sends the SF, included in the user priority level information, to base station 100. Further, control unit 154 establishes a radio link for enabling communication with mobile station terminal 200 through base station 100 over the air.

Base station 100 of the present invention comprises base station storage unit 102 for storing user priority level information received from radio network controller 150, base station control unit 104 for controlling the transmission power to mobile station terminal 200 corresponding to the user priority level information, and a manipulation unit (not shown) for the operator to enter instructions. Base station control unit 104 comprises a CPU for executing predetermined processing in accordance with a program, and a memory for storing programs.

Upon receipt of user priority level information of mobile station terminal 200 from radio network controller 150, base station control unit 104 describes the user priority level information in a priority level management table which is then stored in base station storage unit 102, and transmits information on SF to mobile station terminal 200. If information on the priority level is not included in the user priority level information received from radio network controller 150, base station control unit 104 assigns the lowest priority level to the user priority information which is then stored in base station storage unit 102. In this way, base station control unit 104 preserves the user priority level information of mobile station terminals 200-203 which are in communication within the cell covered thereby. Additionally, when the user priority level information does not include information on the priority level, an arbitrary priority level can be assigned if the operator has previously written into a program the priority level that base station control unit 104 should assign.

Base station storage unit 102 has previously stored therein a lower limit value of the transmission power for one mobile station terminal. The lower limit value is a minimally required value for base station 100 to ensure communication with a mobile station terminal within the cell. As described above, the upper limit value is included in the user priority level information received from radio network controller 150.

Base station storage unit 102 has previously stored therein thresholds for the total transmission power. The set thresholds are threshold 1, and threshold 2 which is a value larger than threshold 1.

Also, base station control unit 104 periodically monitors the total transmission power, and as the total transmission power exceeds threshold 1, base station control unit 104 references the priority level management table stored in base station storage unit 102 to reduce the upper limit value of the transmission power for a dedicated channel of the mobile station terminal which is assigned the lowest priority level. Also, as the total transmission power exceeds threshold 2, base station control unit 104 terminates the call of a mobile station terminal which is assigned a low priority level. The monitoring period can be set to an arbitrary value by the operator who changes a parameter of a program read by base station control unit 104.

Alternatively, the priority levels may be determined by sequentially ranking the number of users one after another, but it is assumed in this embodiment that after the priority levels of the users have been ranked from the lowest level to the highest level, the users are classified into three groups. FIG. 2 shows a scenario where the priority levels are classified into groups 1-3. In the following, a user who belongs to a group of priority level 1 or priority level 2 is called a "high priority user," and a user who belongs to a group of priority level 3 is called a "low priority user."

A description will be given of the operation of base station 100 in the configuration described above for storing information including the priority level of a user. Assume herein that mobile station terminal 200 is connected to base station 100 for communication.

Figure 3:
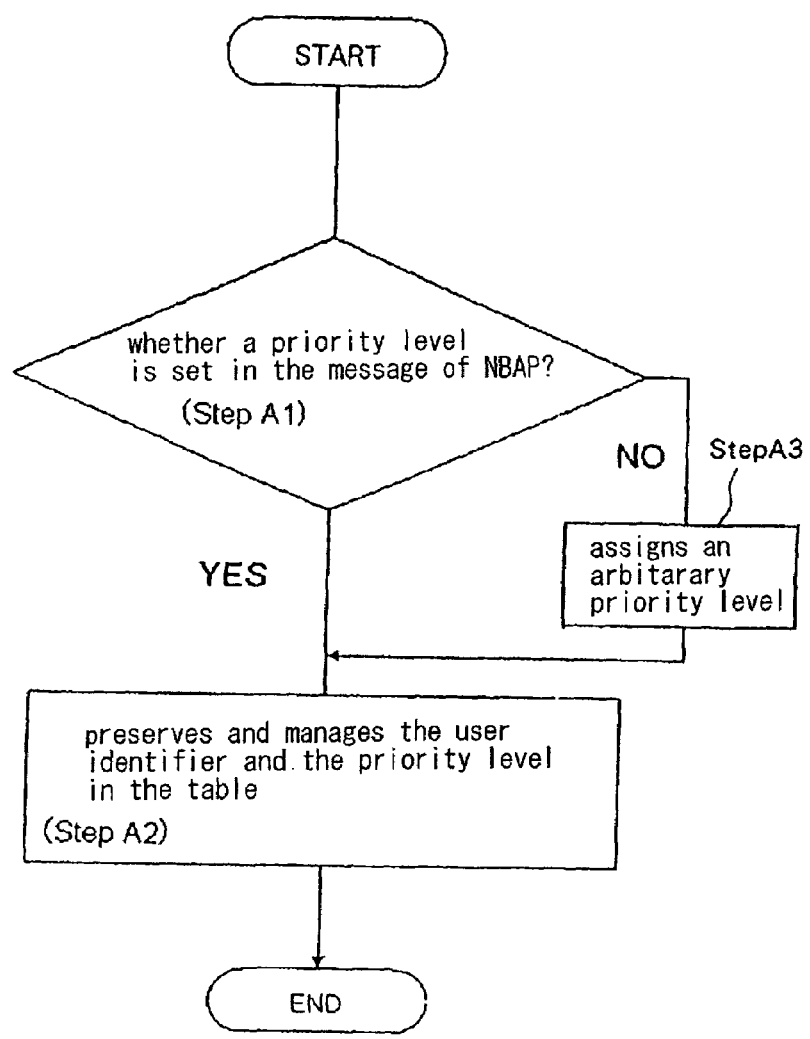
FIG. 3 is a flow chart illustrating an operation procedure of a radio base station apparatus of the present invention for storing priority information.

FIG. 3 is a flow chart illustrating an operation procedure of the base station for storing information on the priority level of the user.

As the user manipulates mobile station terminal 200 to enter the telephone number of a destination, mobile station terminal 200 transmits a call signal to radio network controller 150 through base station 100. Upon receipt of the call signal, radio network controller 150 searches the priority management table for a number which matches the originator telephone number included in the call signal, reads user priority level information, if there is a matching number, from user setting information which is stored together with the number, and transmits the user priority level information, as included in a dedicated channel setting request signal indicative of the contents of communication settings, to base station 100. The dedicated channel setting request signal includes a message such as "Radio Link Setup" for setting a communication, "Radio Link Reconfiguration Prepare" for changing communication contents, or the like in accordance with NBAP (Node B Application Protocol) which is a protocol for information communications between base station 100 and radio network controller 150.

Upon receipt of the dedicated channel setting request signal from radio network controller 150, base station control unit 104 determines whether or not a priority level is set in the user priority level information included in the dedicated channel setting request signal. Base station control unit 104 makes this determination each time it receives the dedicated channel setting request signal from radio network controller 150 (step A1).

When a priority level is included in the user priority information of the dedicated channel setting request signal at step A1, base station control unit 104 preserves and manages the user priority information, including a telephone number which serves as a user identifier, and the priority level, in the priority level management table in base station storage unit 102 (step A2). FIG. 2 shows the priority level of each mobile station terminal.

On the other hand, when no priority level is included in the user priority level information received from radio network controller 150 at step A1, base station control unit 104 assigns an arbitrary priority level, for example, the lowermost priority level, indicative of the lowest priority (step A3), and then preserves the user priority level information including the priority level in the priority level management table in base station storage unit 102 (step A2). Here, when no priority level is included, the lowest priority level is assigned, but the operator may have previously manipulated base station 100 to write in a program a remark that the priority level determination is not applied to such a dedicated channel setting request signal, so that the dedicated channel setting request signal is excluded from the priority determination.

Next, a description will be given of the operation of the base station for controlling the total transmission power.

Figure 4:
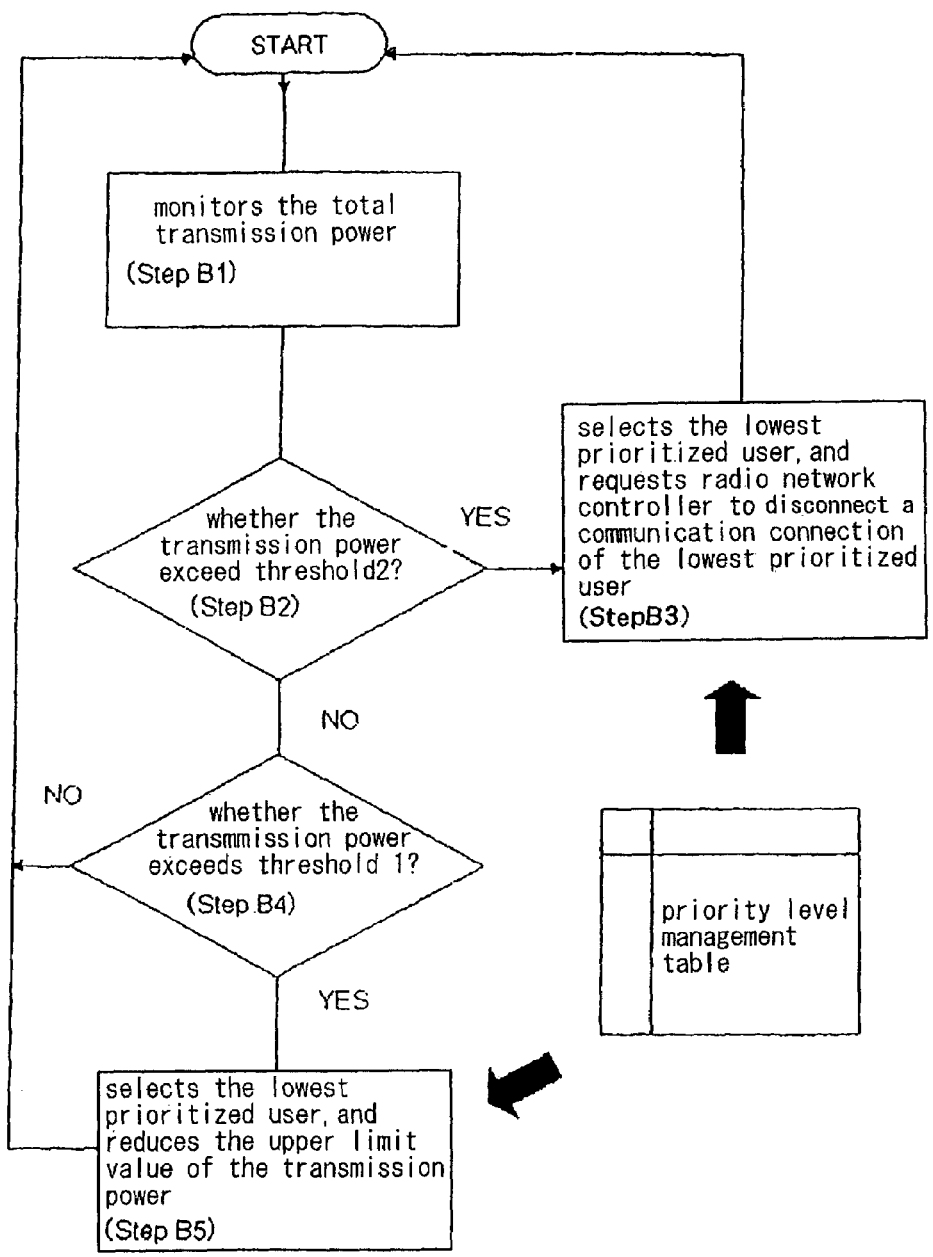
FIG. 4 is a flow chart illustrating an operation procedure of a radio base station apparatus for controlling total transmission power.
Figure 5A:
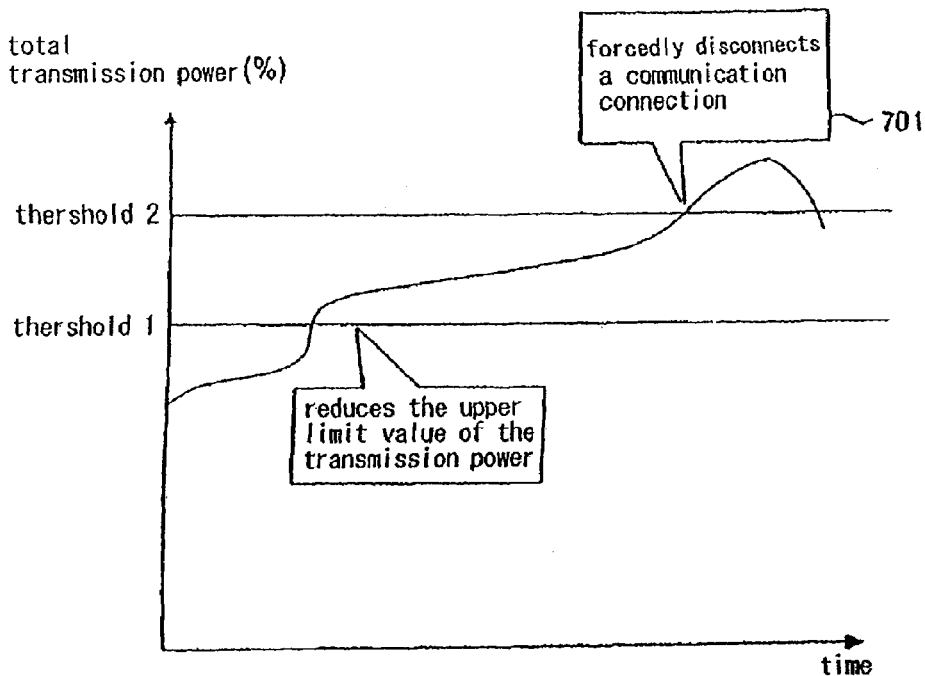
FIG. 5A is a graph for describing a method for controlling the total transmission power.
Figure 5B:
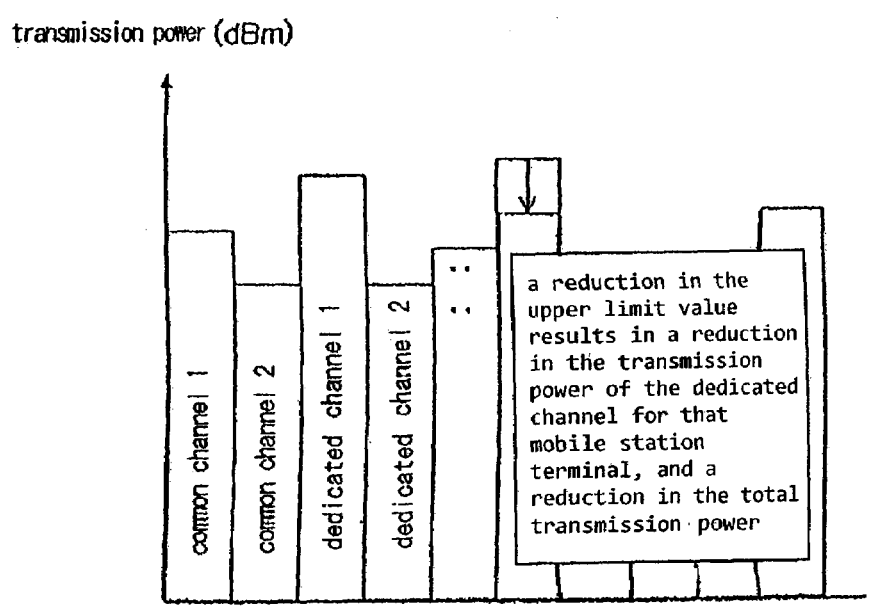
FIG. 5B is a graph for describing the method for controlling the total transmission power.

FIG. 4 is a flow chart illustrating an operation procedure of the base station for controlling the total transmission power. FIGS. 5A and 5B are diagrams for describing control of the total transmission power. FIG. 5A is a graph showing a change in the total transmission power level, where the vertical axis represents the magnitude of total transmission power, and the horizontal axis represents the time. FIG. 5B is a graph showing the magnitude of transmission power for each mobile station terminal.

As illustrated in FIG. 4, base station control unit 104 measures the time from the start, periodically monitors the total transmission power (step B1), and determines whether or not the total transmission power exceeds threshold 2 (step B2).

When the total transmission power exceeds threshold 2 at step B2 as shown in FIG. 5A, base station control unit 104 selects the lowest prioritized user from the priority level management table stored in base station storage unit 102. In FIG. 2, mobile station terminal 203 presents the lowest priority level. For forcedly disconnecting a call with the lowest prioritized mobile station terminal, base station control unit 104 sends release request signal 701 to radio network controller 150 (step B3). The release request signal includes the telephone number of mobile station terminal 203 which is to be released. For reference, the release request signal includes a message of "Radio Link Failure" in accordance with NBAP.

Then, upon receipt of the release request signal from base station 100, control unit 154 of radio network controller 150 disconnects a call identified by the telephone number included in the release request signal. Subsequently, control unit 154 transmits a release completion signal to base station 100, indicating that the communication connection has ended. The release completion signal includes the telephone number of mobile station terminal 203 which was subject to the release.

Upon receipt of the release completion signal from radio network controller 150, base station control unit 104 stops the transmission of a dedicated channel for mobile station terminal 203 which has the telephone number included in the release completion signal.

On the other hand, when the total transmission power does not exceed threshold 2 at step B2, base station control unit 104 determines whether or not the total transmission power exceeds threshold 1 (step B4). When the total transmission power exceeds threshold 1, base station control unit 104 selects the lowest prioritized user from the priority level management table stored in base station storage unit 102, and reduces the upper limit value of the transmission power of the dedicated channel for mobile station terminal 203 of the selected user by a fixed amount (step B5), as shown in FIG. 5B. In this event, as shown in FIG. 5B, since the transmission power for mobile station terminal 203 has already reached the upper limit value, a reduction in the upper limit value results in a reduction in the transmission power of the dedicated channel for that mobile station terminal, and a reduction in the total transmission power as well.

Further, if the total transmission power still remains larger than threshold 1 even after the upper limit value of the transmission power has been reduced for the mobile station terminal of the lowest prioritized user, base station control unit 104 repeats the procedure illustrated in FIG. 4 until the total transmission power becomes smaller than threshold 1. Base station control unit 104 acts in the following manner so as not to select only the mobile station terminal of the lowest prioritized user every time.

Upon selection of a mobile station terminal which is to be controlled at step 5, base station control unit 104 records the number of times of processing to reduce the upper limit value of the transmission power, for each low priority user in the priority level management table of base station storage unit 102, and references the priority level management table to select a user who is assigned a low priority level and who has least frequently undergone processing for reducing the upper limit value.

After the processing to reduce the upper limit value of transmission power has been executed for mobile station terminals of all low priority users, upper limit value reduction processing is not executed for each mobile station terminal. This also applies when a mobile station terminal is selected to be controlled in the event of threshold 2.

In this embodiment, as described above, when the total transmission power exceeds threshold 2, base station control unit 104 terminates the call for a mobile station terminal of the lowest prioritized user, thereby reducing the total transmission power immediately. By terminating communication with one mobile station terminal, the total transmission power can be suppressed. Conventionally, the transmission power is reduced for all mobile station terminals, thereby causing disconnection of calls from mobile station terminals which suffer from poor reception conditions within a cell irrespective of the users' priority levels, whereas this embodiment can prevent disconnection of calls from an indefinite number of mobile station terminals. Also, the larger communication capacity is, the higher is the priority level set, it is possible to prevent a reduction in transmission power for a communication which requires large capacity, thus allowing for a stable communication even when a large amount of information is sent.

The system operation company in turn can provide a service which increases communication probability for a call from/to a high priority user, as compared with a low priority user.

Further, when the total transmission power exceeds threshold 1, base station control unit 104 reduces the upper limit value of the transmission power for the mobile station terminal of the lowest prioritized user to avoid supplying the transmission power equal to or higher than the reduced upper limit value, whereby the mobile terminal station of the lowest prioritized user is not supplied with transmission power which exceeds the newly set upper limit value. Accordingly, it is possible to restrain the rate at which the total transmission power increases.

Next, a description will be given of one method for reducing the upper limit value of the transmission power by base station 100. Assume that mobile station terminal 203 is a terminal of the lowest prioritized user.

Figure 6A:
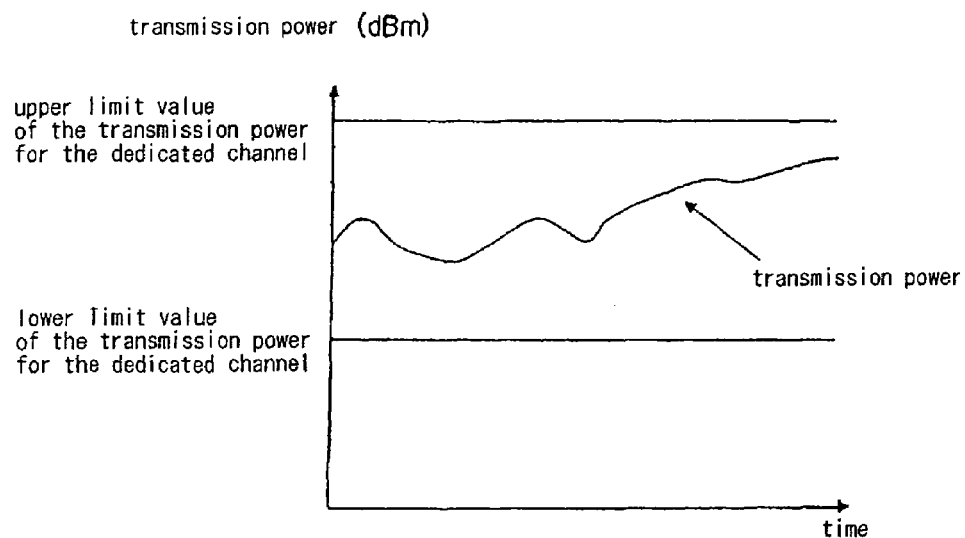
FIG. 6A is a graph showing a history of the transmission power before processing for reducing an upper limit value of the transmission power.
Figure 6B:
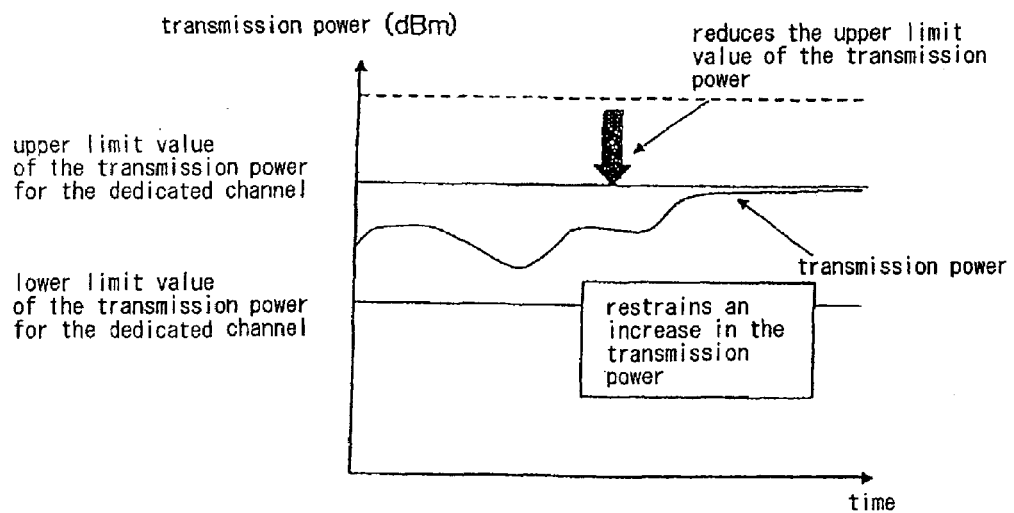
FIG. 6B is a diagram for describing a first method for reducing the upper limit value of the transmission power by the radio base station apparatus of Embodiment 1.

FIGS. 6A and 6B are graphs showing the transmission power from the base station to the mobile station terminal. FIG. 6A is a graph showing the case where the base station does not control the transmission power, and FIG. 6B is a graph showing the case where the base station controls the transmission power. In the graphs of FIGS. 6A and 6B, the vertical axis represents the magnitude of transmission power, and the horizontal axis The user often utilizes mobile station terminal 203 while moving within a cell covered by base station 100. In this event, a radio propagation environment changes due to radio-wave obstacles such as buildings and houses located between mobile station terminal 203 and base station 100, so that base station control unit 104 changes the transmission power for mobile station terminal 203 in order to maintain communications with mobile station terminal 203. For this reason, the transmission power from base station 100 to mobile station terminal 203 generally fluctuates between an upper limit value and a lower limit value, as shown in FIG. 6A. The upper limit value of a dedicated channel transmission power, shown in FIG. 6A, has been read from the user priority level information, in which the upper limit value is registered, and set by base station control unit 104.

Further, as the user continues to move in a direction further away from base station 100, mobile station terminal 203 also moves further away from base station 100 together with the user, so that mobile station terminal 203 receives a signal from base station 100 in an worsened reception condition and therefore transmits a power request signal to base station 100 for requesting the same to increase the transmission power. Upon receipt of the power request signal from mobile station terminal 203, base station control unit 104 increases the transmission power value to mobile station terminal 203. Thus, as shown in FIG. 6A, the transmission power approaches the upper limit value little by little over time.

Base station control unit 104 reduces the upper limit value of the transmission power for the dedicated channel associated with mobile station terminal 203 of the lowest prioritized user in accordance with the control method described above, as shown in FIG. 6B. In the scenario shown in FIG. 6B, the upper limit value is set to a value smaller than the transmission power which has been supplied to mobile station terminal 203.

In this way, it is possible to restrain an increase in the total transmission power of base station 100. Also, the upper limit value of the transmission power from base station 100 to each mobile station terminal depends on the priority level of the user.

Next, a description will be given of a second method for reducing the upper limit value of the transmission power by base station 100. Assume that mobile station terminal 203 is a terminal of the lowest prioritized user.

Figure 7A:
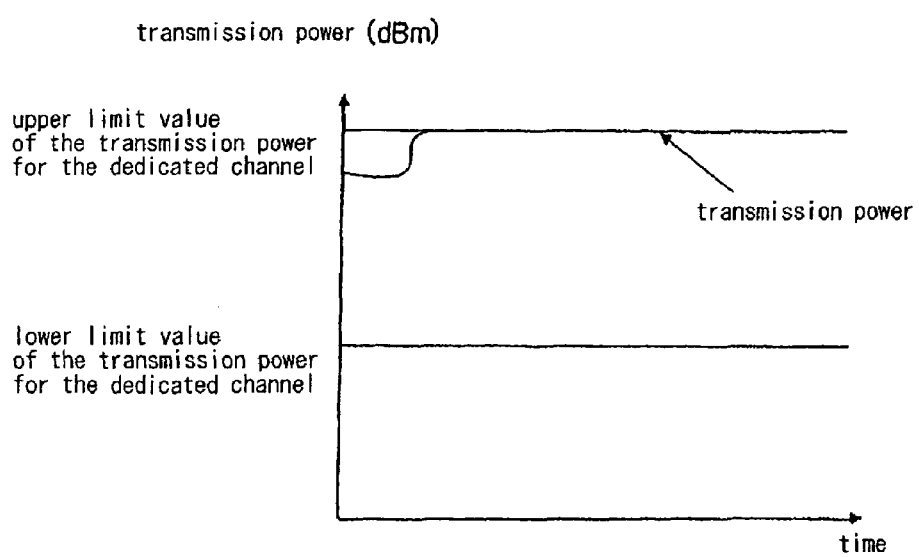
FIG. 7A is a graph showing a history of the transmission power before processing for reducing the upper limit value of the transmission power.
Figure 7B:
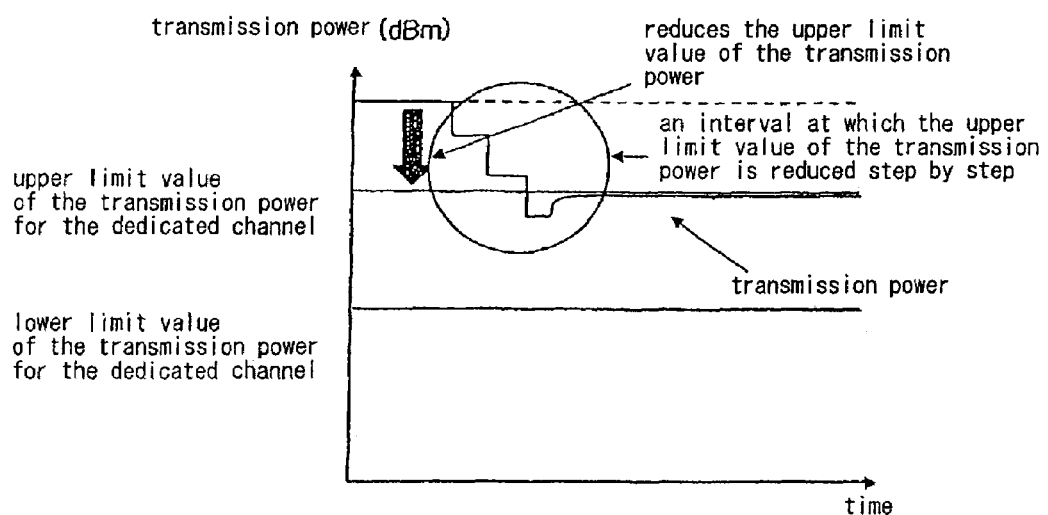
FIG. 7B is a diagram for describing a second method for reducing the upper limit value of the transmission power by the radio base station apparatus of Embodiment 1.

FIGS. 7A and 7B are graphs showing the transmission power value from the base station to the mobile station terminal. FIG. 7A is a graph showing the case where the base station does not control the transmission power, and FIG. 7B is a graph showing the case where the base station controls the transmission power. In the graphs of FIGS. 7A and 7B, the vertical axis represents the magnitude of the transmission power value, and the horizontal axis represents the time.

As shown in FIG. 7A, the transmission power from base station 100 to mobile station terminal 203 can continuously stay at the upper limit value. To prevent such a state, base station control unit 104 forcedly reduces the upper limit value of the transmission power. In this event, a sudden reduction in the transmission power could cause disconnection of a call from/to mobile station terminal 203. For this reason, base station control unit 104 reduces the upper limit value of the transmission power step by step at predetermined time intervals, as shown in FIG. 7B. The operator is allowed to manipulate base station 100 to freely set parameters, having a number by which the amount of the reduced upper limit value is equally divided into a plurality of steps, and having a time intervals at which the transmission power is reduced step by step.

As the transmission power is reduced step by step in the manner described above, the user can be notified that the reception condition is worsening little by little. In this event, since mobile station 203 can be prevented from a sudden shut-off of communication, the user can take countermeasures such as finishing a call quickly, approaching base station 100 so as to improve the reception condition.

In the present invention, as described above, the thresholds have been previously set for the total transmission power of base station 100, such that when the total transmission power exceeds the thresholds, the upper limit value of the transmission power for a dedicated channel is reduced for a mobile station terminal of the lowest prioritized user, or a call is disconnected. In this way, the total transmission power value of base station 100 is prevented from increasing so as to reduce the probability that the total transmission power value exceeds 100%.

Also, conventionally, the transmission power from base station 100 is attenuated for all mobile station terminals within a cell irrespective of users' priority levels, without distinguishing a common channel from a dedicated channel, possibly resulting in disconnection of a call from/to a mobile station terminal of a high priority user, possibly resulting in a reduction in a communication connection area due to an attenuated common channel. However, these problems are avoided.

Also, by restraining the transmission power from base station 100 for a mobile station terminal of the lowest prioritized user, the transmission power can be supplied from the base station for a longer time than before, such that base station 100 is prevented from increasing the total transmission power, and mobile terminal stations of high priority users are provided with ideal reception quality.

Further, since the transmission power provided from the base station can be changed depending on the priority level of a user, a high priority user can increase radio capacity for his or her mobile station terminal.

Embodiment 2

In this embodiment, SF is utilized, in addition to the user's priority level, as a criterion for the base station to select a mobile station terminal which is subject to a forced termination of communication or a reduction in transmission power upper limit value. Since this embodiment is similar in configuration to Embodiment 1, a detailed description thereof is omitted.

A description will be given of a method for selecting a mobile station terminal for which the transmission power is controlled in this embodiment.

At step B2 and step B5 shown in FIG. 4, upon selection of the lowest prioritized user, base station control unit 104 references SF of each user if the priority level management table enumerates a plurality of users who are assigned the same priority level. As a result of referencing the SF's, base station control unit 104 selects a mobile station terminal of the user who presents the smallest SF for transmission power control processing.

Here, a description will be given of a procedure for selecting the terminal which is assigned the lower priority level from among mobile station terminal 201 and mobile station terminal 202 shown in FIG. 2.

Base station control unit 104 compares the priority level of mobile station terminal 201 with that of mobile station terminal 202, and then compares the SF's because they are assigned the same priority level of "2." Mobile station terminal 201 presents the SF of "64" while mobile station terminal 202 presents the SF of "128." Since the SF of mobile station terminal 201 is smaller than mobile station terminal 202, base station control unit 104 selects mobile station terminal 201 as the lower prioritized terminal.

In a CDMA communications system, the smaller the SF, the larger is the transmission power that is required by mobile station terminal. Accordingly, base station control unit 104 selects a mobile station terminal which presents a smaller SF by referencing the SF's described in the priority level management table of base station storage unit 102, in order to reduce the total transmission power. In this way, base station control unit 104 selects, with a higher probability, a mobile station terminal which requires larger transmission power, as subject to processing for reducing the upper limit value of the transmission power.

Next, a description will be given of one method for reducing the upper limit value of the transmission power for the mobile station terminal selected in the manner described above.

Figure 8A:
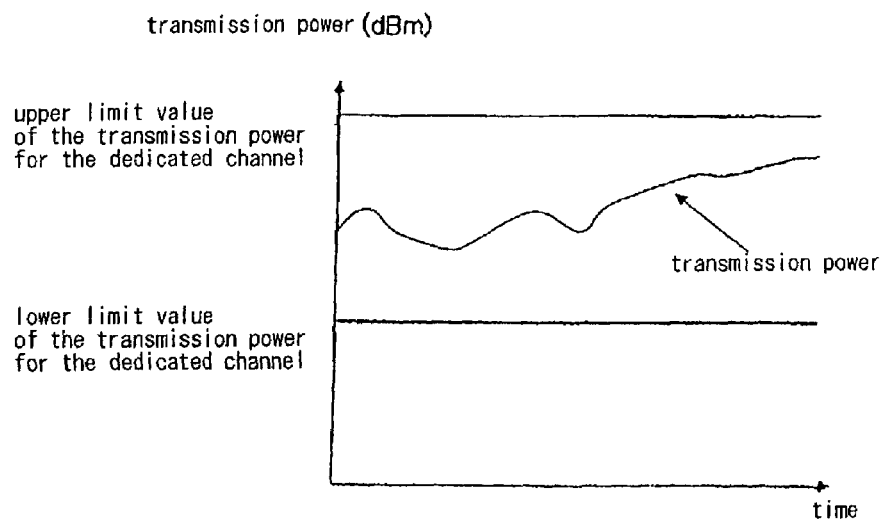
FIG. 8A is a graph showing a history of the transmission power before processing for reducing the upper limit value of the transmission power.
Figure 8B:
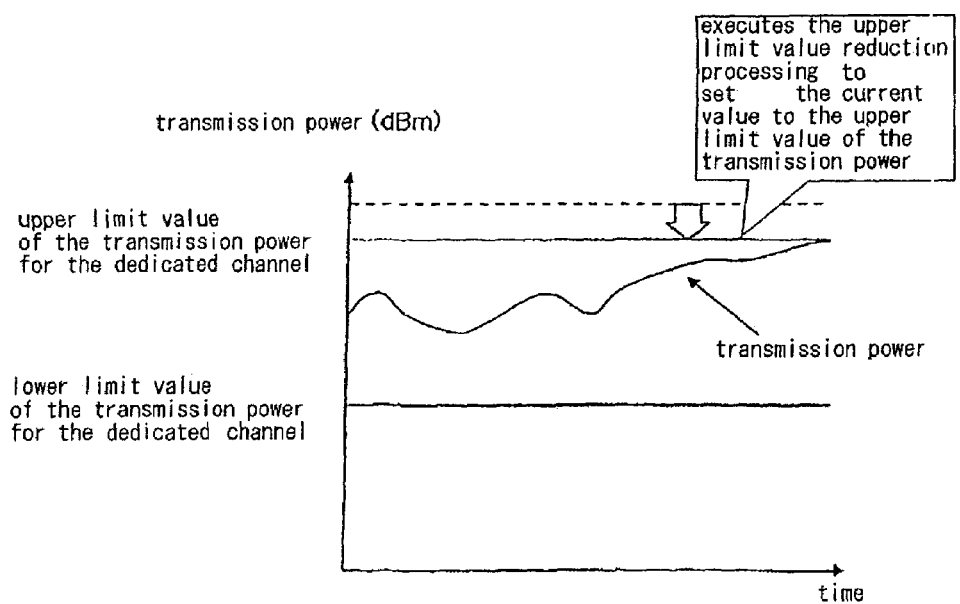
FIG. 8B is a diagram for describing a first method for reducing the upper limit value of the transmission power by a radio base station apparatus of Embodiment 2.

FIG. 8A is a graph showing a history of the transmission power before processing to reduce the upper limit value of the transmission power, and FIG. 8B is a graph showing the case where processing is executed to reduce the upper limit value of the transmission power. In the graphs of FIGS. 8A and 8B, the vertical axis represents the transmission power value, and the horizontal axis represents the time.

As shown in FIG. 8A, transmission power to the mobile station terminal approaches the upper limit value little by little while fluctuating between the lower limit value and upper limit value. In order to prevent the transmission power from increasing beyond a current value in FIG. 8A, base station control unit 104 executes upper limit value reduction processing to set the current value to the upper limit value of the transmission power for this mobile station.

The new upper limit value after upper limit value reduction processing has been executed is indicated by a solid line in FIG. 8B. The value of the transmission power from base station 100 to the mobile station terminal will not increase beyond the current value.

This method can not only maintain the transmission power which satisfies reception quality currently required by the mobile station terminal, but can also flexibly accommodate the radio environment, geographic features, time zone and the like in which the mobile station terminal is placed. Also, it is possible to reduce the probability that a situation arises in which the mobile station terminal is forced to disconnect a call after base station 100 has reduced the upper limit value of the transmission power. In addition, since the current transmission power is ensured even for a low priority mobile station terminal, a sudden termination of communication connection with the mobile station terminal can be prevented.

Next, a description will be given of a second method for reducing the upper limit value of the transmission power.

The method used herein determines an amount by which the upper limit value is reduced at two stages which involve communication setting information and the SF that are included in user priority level information recorded in a priority level management table, irrespective of a current transmission power value for a mobile station terminal. As described in Embodiment 1, the type of service is determined from the communication setting information.

For reducing the upper limit value of the transmission power, base station control unit 104 reads communication setting information of an intended mobile station terminal to determine a first amount of the transmission power that will be reduced. For example, in regard to communication contents in the communication setting information, the amount of the transmission power that will be reduced is reduced for a videophone because it requires a larger amount of information as compared with voice only, so that the user is charged a higher fee. The reduction amount of the transmission power that will be reduced is also reduced in a similar manner when a large communication capacity is set in the communication setting information. The lager the communication capacity, the smaller the upper limit value that will be reduced, it is possible to prevent the upper limit value of the transmission power from being largely reduced for communication which requires a large capacity, thus ensuring stable communications even when a large amount of information is sent.

Subsequently, base station control unit 104 reads the value of SF of the mobile station terminal to determine a second amount of the transmission power that will be reduced. In this event, the smaller the value of SF is, the larger the transmission power is. Therefore, the amount of the transmission power that will be reduced is increased for a smaller SF value. Then, base station control unit 104 calculates a total amount which is the sum of the first and second amount of the transmission power that will be reduced, and reduces the upper limit value by the total amount. It should be noted that since the amount of the upper limit value that will be reduced is also affected by a radio environment of a mobile station terminal, and geographic features, the operator can arbitrarily set the parameters for determining the amount for base station 100.

Figure 9A:
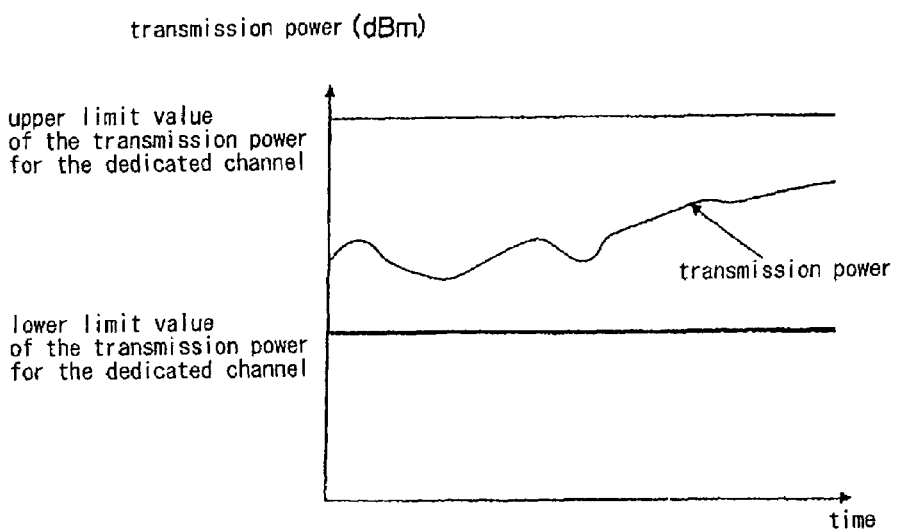
FIG. 9A is a graph showing a history of the transmission power before processing for reducing the upper limit value of the transmission power.
Figure 9B:
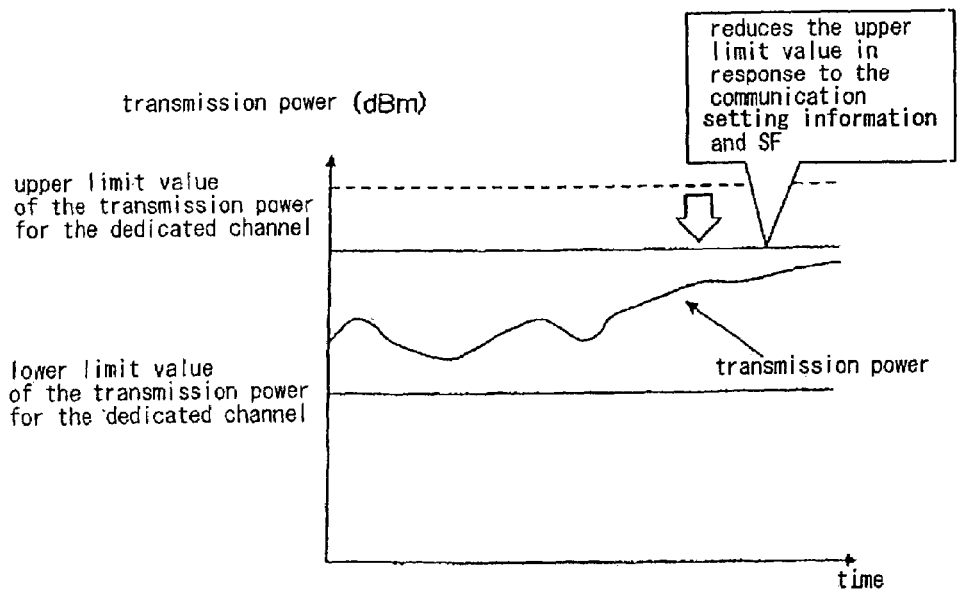
FIG. 9B is a diagram for describing a second method for reducing the upper limit value of the transmission power by the radio base station apparatus of Embodiment 2.

FIG. 9A is a graph showing a history of transmission power before processing to reduce the upper limit value of the transmission power, and FIG. 9B is a graph showing the case where processing has been executed to reduce the upper limit value of the transmission power. In the graphs of FIGS. 9A and 9B, the vertical axis represents the transmission power value, and the horizontal axis represents the time.

Like FIG. 8A, the graph of FIG. 9A shows the history of transmission power for a mobile station terminal, which approaches the upper limit value little by little while fluctuating between the lower limit value and upper limit value. Before the transmission power reaches the upper limit value, base station control unit 104 finds a total amount for the upper limit value as described above, and subtracts the total amount from the predetermined upper limit value, resulting in a new upper limit value indicated by a solid line in FIG. 9B.

In this method, the amount by which the upper limit value of transmission power is reduced is set by the communication setting information and SF, so that the mobile station terminal suffers a lower probability of disconnected calls after base station 100 has reduced the upper limit value of the transmission power. Also, since transmission power is reduced to a certain level irrespective of the current transmission power value, it is possible to restrain the number of mobile station terminals which are supplied with insufficient transmission power due to the total transmission power that has been reduced below threshold 2.

Next, a description will be given of a third method for reducing the upper limit value of transmission power.

The method used herein reduces the upper limit value by a predetermined fixed amount irrespective of current transmission power for a mobile station terminal, communication setting information, and SF.

Figure 10A:
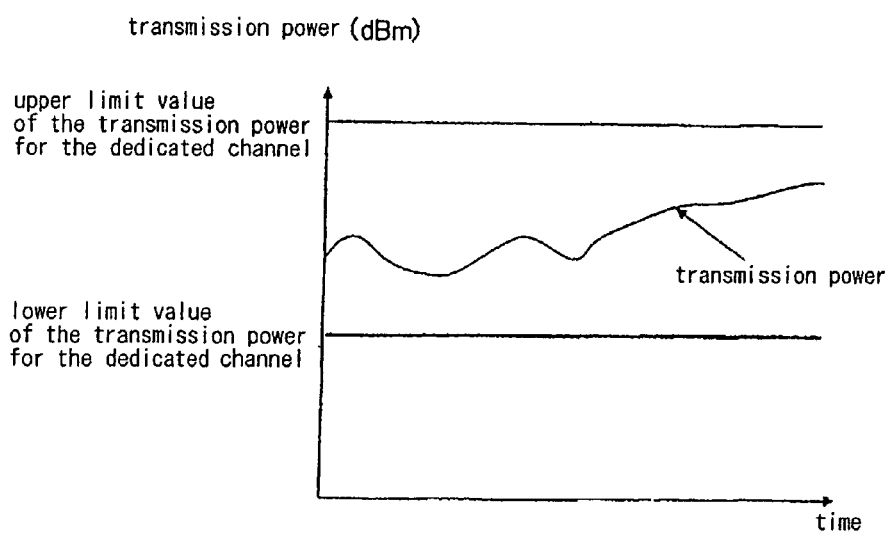
FIG. 10A is a graph showing a history of the transmission power before processing for reducing the upper limit value of the transmission power.
Figure 10B:
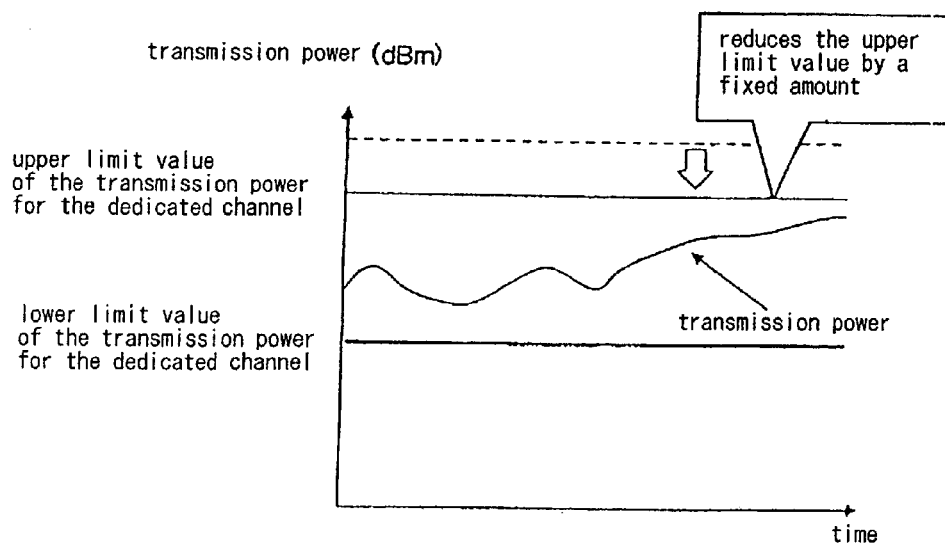
FIG. 10B is a diagram for describing a third method for reducing the upper limit value of the transmission power by the radio base station apparatus of Embodiment 2.

FIG. 10A is a graph showing a history of transmission power before the processing to reduce the upper limit value of the transmission power, and FIG. 10B is a graph showing the case where processing has been executed to reduce the upper limit value of the transmission power. In the graphs of FIGS. 10A and 10B, the vertical axis represents the transmission power value, and the horizontal axis represents the time.

Like FIG. 8A, the graph of FIG. 10A shows the history of transmission power for a mobile station terminal, which approaches the upper limit value little by little while fluctuating between the lower limit value and upper limit value. Before the transmission power reaches the upper limit value, base station control unit 104 reduces the upper limit of the transmission power by a predetermined fixed amount. A new upper limit value after the upper limit value reduction processing has been executed is indicated by a solid line in FIG. 10B.

Since this method reduces the total transmission power below threshold 2, this method is apt to estimate the number of mobile station terminals which may be subject to a reduction in the upper limit value of the transmission power. Additionally, when the operator is allowed to arbitrarily set the reduction amount through parameters, communications between mobile station terminals and the base station can be controlled in accordance with a lost call rate desired by the system operation company.

While the type of service for determining a priority level is determined from three items in Embodiment 1 and Embodiment 2, the items are not limited to three, and the items may have different contents. Further, the priority level may be determined using other information such as user accounting information and is not limited to the type of service.

Also, the method for reducing the upper limit value of the transmission power shown in Embodiment 1 may be used in Embodiment 2, whereas the method for reducing the upper limit value of the transmission power shown in Embodiment 2 may be used in Embodiment 1.

As described above, in the present invention, the radio base station apparatus monitors the total transmission power value, and manages control to restrain the upper limit value of the transmission power for a low priority user, or manages control to request the termination of a call from/to the low priority user when the total transmission power value exceeds a certain threshold. It is therefore possible not to exceed an upper limit value of a radio capacity so as to protect the radio base station apparatus, and it is possible to reduce the probability that a call from/to a mobile station terminal of a high priority user will be disconnected.

Also, when the total transmission power of the radio base station apparatus reaches 100%, the transmission power will not be uniformly reduced for all mobile station terminals, thus making it possible to reduce the probability that a plurality of users will suffer from disconnected calls.

Also, since transmission power is still controlled for individual mobile station terminals even after the total transmission power has reached 100%, transmission power for the common channel will not be attenuated, thus making it possible to avoid a reduction of an area covered by the radio base station apparatus. This can lead to a lower probability of occurrence of failed hand-over between radio base station apparatuses. It is also possible to eliminate a region in which a mobile terminal station cannot originate or receive a call within a cell covered by the radio base station apparatus.

Further, a company which operates a communications system can change a radio capacity and a situation in which a call is connected or disconnected for a mobile station terminal of each user by setting a priority level on a user-by-user basis. Accordingly, the company can preferentially disconnect calls from the mobile station terminals of users who are assigned low priority levels due to a delay in paying the fee, and can stabilize call connections for mobile station terminals of users who are assigned high priority levels by maintaining an upper limit value of transmission power from the radio base station apparatus unchanged from an initial value.

It goes without saying that the present invention is not limited to the embodiments described above, but a variety of modifications can be made within the scope of the invention, and they are also included in the scope of the present invention.

The invention claimed is:

1. A radio base station apparatus configured for communicating with a plurality of mobile station terminals, comprising:

a storage unit having stored therein upper limit values of transmission power for said mobile station terminals, a first threshold referenced to determine whether or not the transmission power is reduced, a second threshold larger than the first threshold, and priority levels of said mobile station terminals; and a control unit for monitoring total transmission power which is a sum of the transmission power for all said mobile station terminals connected for mutual communication, the control unit, by a predetermined value, reducing the upper limit value of the transmission power for said mobile station terminal which is assigned the lowest priority level when the total transmission power exceeds the first threshold, and terminating communications with said mobile station terminal which is assigned the lowest priority level when the total transmission power exceeds the second threshold.

2. The radio base station apparatus according to claim 1, wherein the larger a communication capacity that is required by said mobile station terminal, the higher is said priority level assigned to said mobile station terminal.

3. The radio base station apparatus according to claim 1, wherein:
when the radio base station is connected with said mobile station terminals through communications using a spread spectrum technology,
the smaller a spreading factor that is used in the communication, the lower the priority level assigned by said control unit.

4. The radio base station apparatus according to claim 3, wherein:
the smaller the spreading factor, the larger is said predetermined value assigned by said control unit.

5. The radio base station apparatus according to claim 1 wherein:
the larger the communication capacity that is required by said mobile station terminal, the smaller is said predetermined value assigned by said control unit.

6. The radio base station apparatus according to claim 5, wherein:
said control unit reduces the upper limit value by said predetermined value in stages.

7. The radio base station apparatus according to claim 1, wherein:
said control unit calculates the difference between the upper limit value stored in said storage unit and the current transmission power for said mobile station terminal, and sets the difference in values to said predetermined value.

8. The radio base station apparatus according to claim 7, wherein:
said control unit reduces the upper limit value by said predetermined value in stages.

9. The radio base station apparatus according claim 1, wherein:
said control unit reduces the upper limit value by said predetermined value in stages.

10. A transmission power control method by a radio base station apparatus, having a control unit and a storage unit, for communicating with a plurality of mobile station terminals, said method comprising the steps of:

storing upper limit values of transmission power for said mobile station terminals, with a first threshold referenced to determine whether or not the transmission power is reduced, a second threshold larger than the first threshold, and priority levels of said mobile station terminals in said storage unit;
monitoring total transmission power which is a sum of the transmission power for all said mobile station terminals connected for mutual communication; and
reducing the upper limit value of the transmission power by a predetermined value, for said mobile station terminal, which is assigned the lowest priority level, when the total transmission power exceeds the first threshold, and terminating communications with said mobile station terminal, which is assigned the lowest priority level, when the total transmission power exceeds the second threshold.

11. The transmission power control method according to claim 10, wherein the larger a communication capacity required by said mobile station terminal, the higher is said priority level assigned to said mobile station terminal.

12. The transmission power control method according to claim 10, wherein:
when the radio base station is connected with said mobile station terminal through communications using a spread spectrum technology,
the smaller a spreading factor that is used in the communication, the lower is said assigned priority level.

13. The transmission power control method according to claim 12, wherein:
the smaller the spreading factor, the larger is said assigned predetermined value.

14. The transmission power control method according to claim 10, wherein:
the larger the communication capacity that is required by said mobile station terminal, the smaller is said assigned predetermined value.

15. The transmission power control method according to claim 14, wherein:
when the upper limit value is reduced, it is reduced by said predetermined value in stages.

16. The transmission power control method according to claim 10, wherein:
said predetermined value is set to the difference between the upper limit value stored in said storage unit and the current transmission power for said mobile station terminal.

17. The transmission power control method according to claim 16, wherein:
when the upper limit value is reduced, it is reduced by said predetermined value in stages.

18. The transmission power control method according to claim 10, wherein:
when the upper limit value is reduced, it is reduced by said predetermined value in stages.

* * * * *